Feb. 14, 1933.  O. FRITZE  1,897,474
GASEOUS ELECTRIC DISCHARGE DEVICE
Filed July 24, 1930
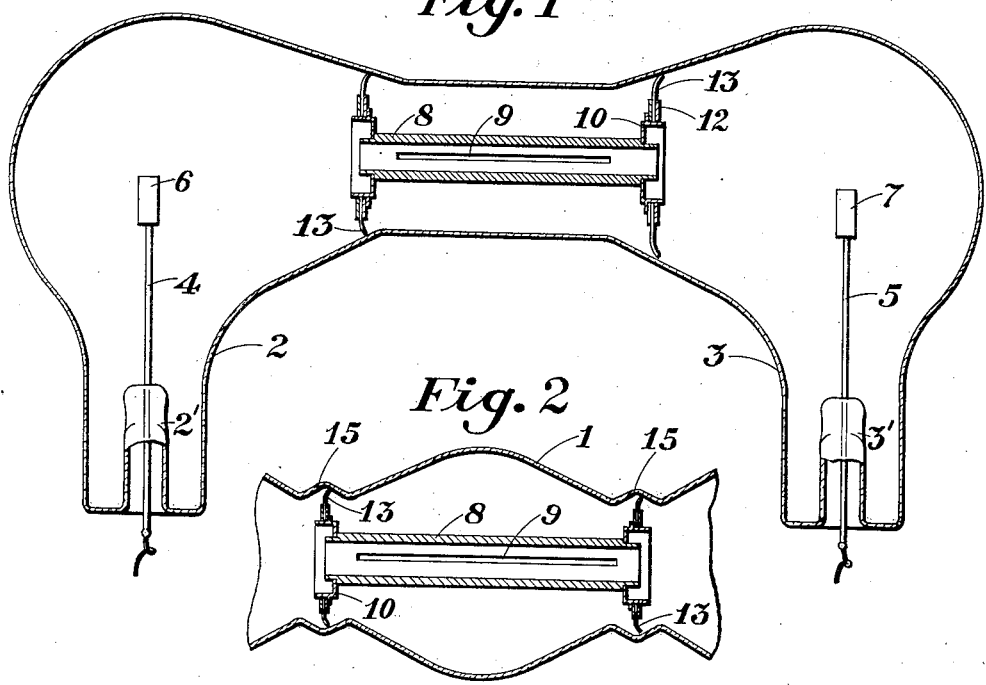
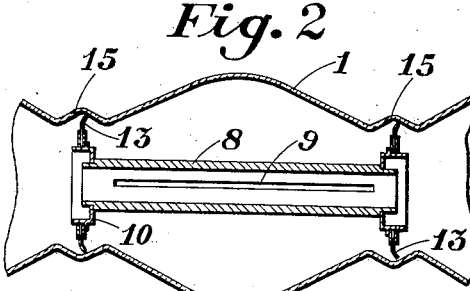
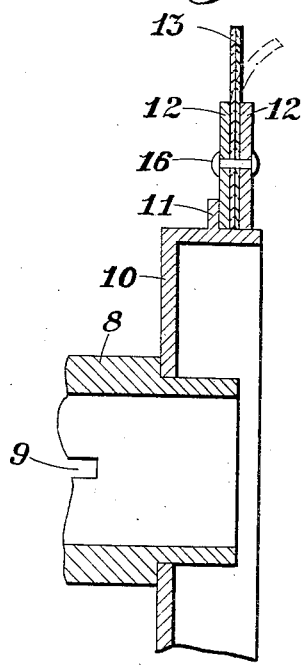
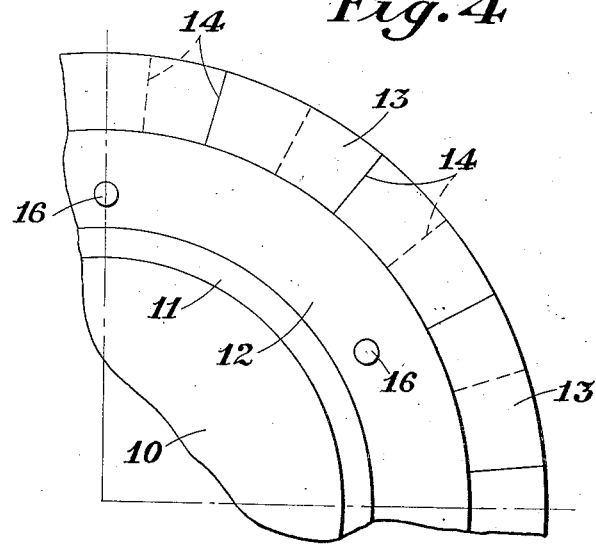
INVENTOR
Otto Fritze
BY Charles E. Mullen
ATTORNEY Patented Feb. 14, 1933

1,897,474

UNITED STATES PATENT OFFICE

OTTO FRITZE, OF BERLIN, GERMANY, ASSIGNOR TO GENERAL ELECTRIC COMPANY, A CORPORATION OF NEW YORK

GASEOUS ELECTRIC DISCHARGE DEVICE

Application filed July 24, 1930, Serial No. 470,363, and in Germany September 3, 1929.

The present invention relates to gaseous electric discharge devices useful in the arts generally and particularly as electric lamps.

The object of this invention is to provide a supporting means for an electric discharge guide tube for gaseous electric discharge devices similar to those described in co-pending applications Serial Number 387,057, filed August 19, 1929, being the invention of Marcello Pirani, Hans Ewest and Alfred Ruttenauer; Serial Number 407,525, filed November 15, 1929; Serial Number 378,741, filed July 15, 1929, and Serial Number 447,015, filed April 24, 1930, being the inventions of Marcello Pirani. Still further objects of the invention will be apparent from the following particular description and from the claim.

In accordance with its object the invention comprises rings of flexible material attached to the ends of the electric discharge guide member and pressing against the inner walls of the container of the electric discharge device. Mica rings are suitable for this purpose though rings of any other flexible material may be used if desired.

In the drawing accompanying and forming part of this specification an embodiment of the new and novel electric discharge guide tube support is shown in which Fig. 1 is a sectional elevational view of the invention in position in an electric discharge device also shown in section, Fig. 2 is a sectional elevational view of the invention and part of another form of container suitable for use in connection with this invention, Fig. 3 is an enlarged sectional elevational view of one end of the electric discharge guide tube with the new and novel supporting means attached thereto, and, Fig. 4 is a front elevational view of the new and novel supporting means shown in section in Fig. 3.

Like numbers denote like parts in all views of the device.

Referring to the drawing the electric discharge device comprises a container 1 having a gaseous filling therein. The neck parts 2, 3 of said container have stems 2', 3' into which are sealed current leads 4, 5 carrying electrodes 6, 7 such as self heating oxide electrodes. In the center portion of said container 1 is located the electric discharge guide 8 which is a cylindrical body made of difficultly fusible material such as carbon or tungsten and has therein a longitudinal slit 9, though it may have any desired openings or perforations. As shown in Fig. 3 at each end of said guide 8 is a supporting means comprising a case 10 having a projecting flange 11, a plurality of flexible mica rings 13 held in position between metal rings 12 by studs 16, said metal rings 12 fitting tightly around said case 10 and against said flange 11. Thus the guide 8 and its supporting means form a unitary member. The parts of mica ring 13 projecting beyond the clamping metal rings 12 have radial slits 14 as shown in Fig. 4. Because of their unitary structure guide 8 and its supporting means 10, 12, 13 may be thrust into the container 1 adapted to receive them, as shown in Figs. 1 and 2. The mica rings 13 are slightly bent by this operation so that the projecting sections of said mica rings 13 overlap each other to prevent a passage of the electric discharge outside the guide tube 8 by dividing container 1 into sections. Said mica rings 13 though flexible to a degree that they may be bent are stiff enough to retain their flexed shape and to support guide 8.

The portion of the container shown in Fig. 2 having two ring shaped enlargements in the region of the mica rings 13 is especially suitable for the guide tube supporting means heretofore disclosed. Such an arrangement maintains the guide tube 8 and its new and novel supporting means in a fixed position in the device.

While I have shown and described and have pointed out in the annexed claim certain new and novel features of the invention it will be understood that various substitutions, modifications and changes in the forms and details of the supporting means may be made by those skilled in the art without departing from the broad spirit and scope of the invention. For example, mica rings 13 may be attached to guide 8 by other methods and in other places, and rings of other flexible material, such as thin metal rings may be used in place of the mica rings 13.

What I claim as new and desire to secure by Letters Patent of the United States, is:

In an electric discharge device, a container, electrodes sealed therein, a gaseous filling therein, a tubular body of conducting material surrounding the discharge path between said electrodes, flexible supporting members for said tubular body capable of retaining their flexed shape, said flexible support members being greater in diameter than the minimum bore of said container to restrain said tubular body from movement in said container and being adapted to fit said container to divide said container into electrical sections.

In witness whereof I have hereunto set my hand this 11th day of July, 1930.

OTTO FRITZE.